United States Patent
Thomas et al.

(10) Patent No.: US 10,979,585 B1
(45) Date of Patent: Apr. 13, 2021

(54) DYNAMIC IMAGE SCALING OF SCANNED IMAGES

(71) Applicant: Xerox Corporation, Norwalk, CT (US)

(72) Inventors: Timothy David Thomas, Fairport, NY (US); Fadi Georges Rouhana, Fairport, NY (US); Jonathan A. Goldstein, Rush, NY (US); Connor Sterling Seiden, Webster, NY (US); Steven Vincent Rosekrans, Rochester, NY (US); Ujwal Menon, Chicago, IL (US); Stephanie Jill Cruz, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/814,115

(22) Filed: Mar. 10, 2020

(51) Int. Cl.
*H04N 1/00* (2006.01)
*H04N 1/393* (2006.01)

(52) U.S. Cl.
CPC ....... *H04N 1/0044* (2013.01); *H04N 1/00448* (2013.01); *H04N 1/00458* (2013.01); *H04N 1/00482* (2013.01); *H04N 1/393* (2013.01)

(58) Field of Classification Search
CPC ............ H04N 1/0044; H04N 1/00442; H04N 1/00445; H04N 1/00448; H04N 1/00458; H04N 1/00482; H04N 1/393; H04N 1/3935
See application file for complete search history.

(56) References Cited

U.S. PATENT DOCUMENTS

| 8,098,395 | B2 | 1/2012 | Kitada et al. | |
| 2011/0279360 | A1* | 11/2011 | Kimura | H04N 1/00448 345/156 |
| 2012/0050800 | A1* | 3/2012 | Maruyama | H04N 1/00456 358/1.15 |
| 2014/0153060 | A1* | 6/2014 | Takahashi | H04N 1/00469 358/468 |

* cited by examiner

*Primary Examiner* — Scott A Rogers

(57) ABSTRACT

A method for dynamically scaling scanned images is disclosed. For example, the method is executed by a processor and includes receiving a scanned image, determining that the scanned image is larger than a previously scanned image, adjusting the previously scanned image to be smaller than the scanned image, generating an adjusted previously scanned image, and causing a display to show the scanned image and the adjusted previously scanned image.

20 Claims, 5 Drawing Sheets

DYNAMIC IMAGE SCALING OF SCANNED IMAGES

The present disclosure relates generally to processing scanned images and, more particularly, to dynamic image scaling of scanned images in a preview operation on a display.

BACKGROUND

Physical documents can be scanned to generate electronic files of the physical documents. Physical documents can be scanned on a multi-function device (MFD). The physical documents can be fed into the MFD. Each page may be positioned on a platen glass that has an optical scanner on the opposite side. The MFD may use an optical scanner to capture an image of the physical document and convert the image into a page of the electronic file. The process may be repeated for each page of the physical document.

SUMMARY

According to aspects illustrated herein, there is provided a method, non-transitory computer readable medium, and an apparatus for dynamically scaling scanned images. One disclosed feature of the embodiments is a method that receives a scanned image, determines that the scanned image is larger than a previously scanned image, adjusts the previously scanned image to be smaller than the scanned image, generates an adjusted previously scanned image, and causes a display to show the scanned image and the adjusted previously scanned image.

Another disclosed feature of the embodiments is a non-transitory computer-readable medium having stored thereon a plurality of instructions, the plurality of instructions including instructions which, when executed by a processor, cause the processor to perform operations that receive a scanned image, determine that the scanned image is larger than a previously scanned image, adjust the previously scanned image to be smaller than the scanned image, generate an adjusted previously scanned image, and cause a display to show the scanned image and the adjusted previously scanned image.

Another disclosed feature of the embodiments is an apparatus comprising a processor and a computer readable medium storing a plurality of instructions which, when executed by the processor, cause the processor to perform operations that receive a scanned image, determine that the scanned image is larger than a previously scanned image, adjust the previously scanned image to be smaller than the scanned image, generate an adjusted previously scanned image, and cause a display to show the scanned image and the adjusted previously scanned image.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to perform dynamic image scaling of scanned images. As discussed above, MFDs can be used to scan physical documents. The physical documents can be scanned by the MFD and be converted into electronic files.

In one embodiment, a display may be associated with the MFD. The scanned images may be shown on the display as part of a preview operation. The preview operation may allow a user to see how the scanned images will appear, be arranged, and look relative to one another.

In some embodiments, the physical documents can include different sized pages and/or different orientations. For example, a sales presentation or brochure may include different sized physical documents. However, previous methods may show each page of the physical document as the same size in the preview operation, even though the pages of the physical documents can be different sizes. For example, previous preview operations may show each scanned image as a thumbnail image, where thumbnail images for all scanned images are all the same size. As a result, the preview operation may not give the user an accurate preview of the appearance of the scanned images. In addition, some images or text may be distorted as all the images are scaled to be the same size.

The present disclosure provides dynamic image scaling of the scanned images. For example, the different sized pages of the physical document may be scaled to show the different sized pages in the scanned images. In one embodiment, scanned images may be shown in the display in a first size. If a subsequent scanned image is larger than previously scanned images, the previously scanned images may be dynamically scaled to appear smaller than the larger scanned image.

In addition, the orientation of the scanned image may be preserved in the preview. For example, previous preview methods may show all the images as thumbnails in a portrait orientation. However, the present disclosure can show a scanned image in a landscape orientation if that is how the physical document is arranged in the physical documents that are scanned. Thus, the present disclosure provides a more accurate preview operation for scanned operations, which allows a user to more quickly and efficiently review scanned images on the display.

Figure 1:
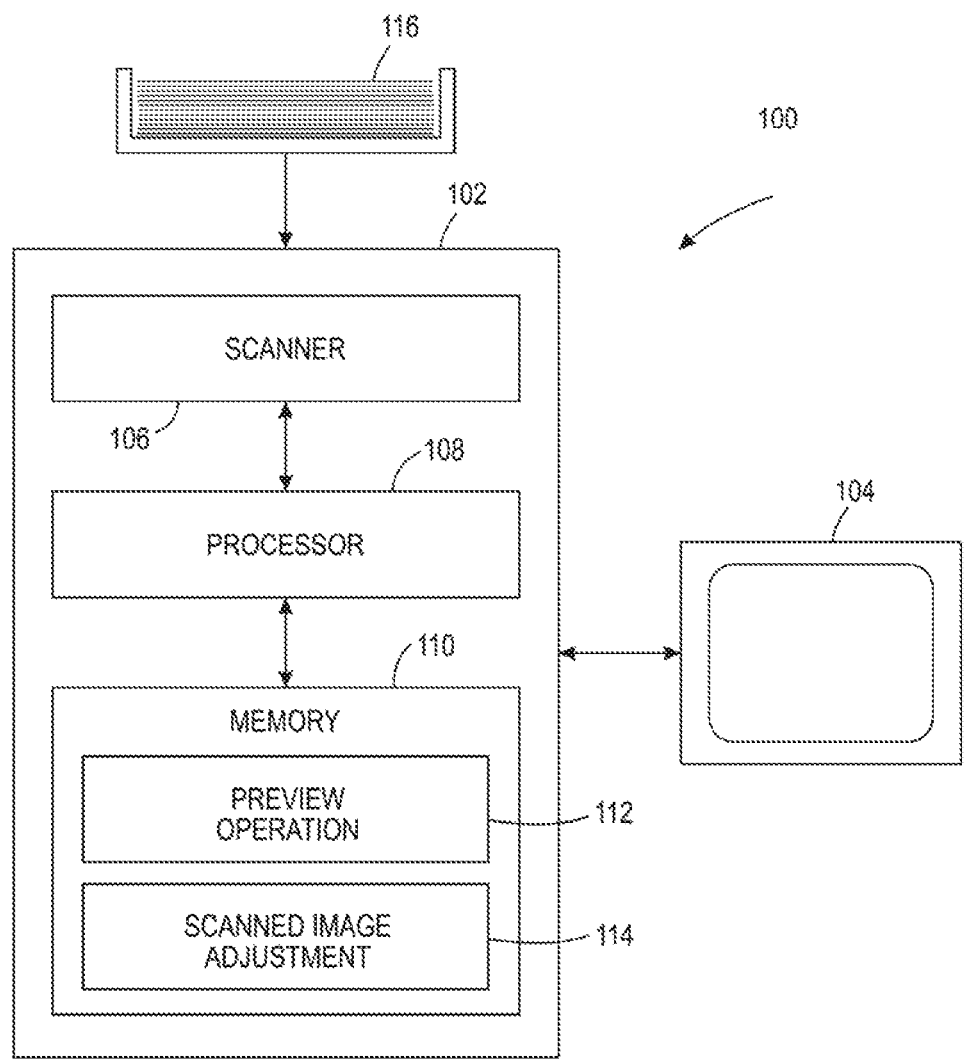
FIG. 1 illustrates a block diagram of a system of the present disclosure.

FIG. 1 illustrates an example system 100 of the present disclosure. In one embodiment, the system 100 may include a multi-function device (MFD) 102 and a display 104. In one embodiment, the display 104 may be part of the MFD 102. In another embodiment, the display 104 may be an external display that is communicatively coupled to the MFD 102. For example, the display 104 may be a laptop computer, a tablet computer, and the like, that can display a preview operation of scanned images.

In one embodiment, the MFD 102 may include a scanner 106, a processor 108, and a memory 110. It should be noted that the MFD 102 has been simplified for ease of explanation and may include other components and devices that are not shown. For example, the MFD 102 may include a printing unit, a finishing module, paper trays, faxing capability, and the like.

In one embodiment, the processor 108 may be communicatively coupled to the scanner 106, the memory 110, and the display 104. The processor 108 may control operation of the scanner 106, generate images to be shown on the display 104, and execute instructions to perform the functions described herein stored in the memory 110.

In one embodiment, the scanner 106 may include a platen glass and an optical scanner to scan or capture images of physical documents 116. The captured images may be provided to the processor 108 to generate scanned images that can be shown on the display 104. In one embodiment, the physical documents 116 may include a plurality of different pages that may be different sizes and/or orientations. For example, some of the physical documents 116 can be 8.5 inches×11 inches, 8.5 inches×14 inches, A4, and the like. Some of the physical documents 116 may be provided in a landscape orientation or a portrait orientation. The physical documents 116 can be fed through the MFD 102 and scanned in an orientation as the physical documents 116 are arranged when fed through the MFD 102.

In one embodiment, the memory 110 may be a non-transitory computer readable medium. For example, the memory 110 may be a hard disk drive, a random access memory, a read only memory, and the like. The memory 110 may store instructions for a preview operation 112 and a scanned image adjustment 114.

In one embodiment, the preview operation 112 may generate scanned images that can be shown on the display 104. Examples of the preview operation 112 are shown in FIGS. 2 and 3, and discussed in further details below.

In one embodiment, the scanned image adjustment 114 may store instructions executed by the processor 108 to dynamically adjust the size of scanned images to maintain an aspect ratio of the scanned images. For example, as discussed above, previous preview operations would display all of the scanned images as the same size, even if different pages that were scanned were different sizes. In other words, a physical page that was 8.5 inches×11 inches would appear as the same size as a physical page that was 8.5 inches×14 inches in the preview operation.

In contrast, the scanned image adjustment 114 may scale, change, or adjust a size of previously scanned images if a currently scanned image is larger than the previously scanned images. The sizes can be changed to maintain an aspect ratio of the size of the physical documents 116 that are scanned. In other words, the size of the previously scanned image can be adjusted on a relative scale compared to a size of a physical document associated with the previously scanned image and a physical document associated with the currently scanned image.

Figure 2:
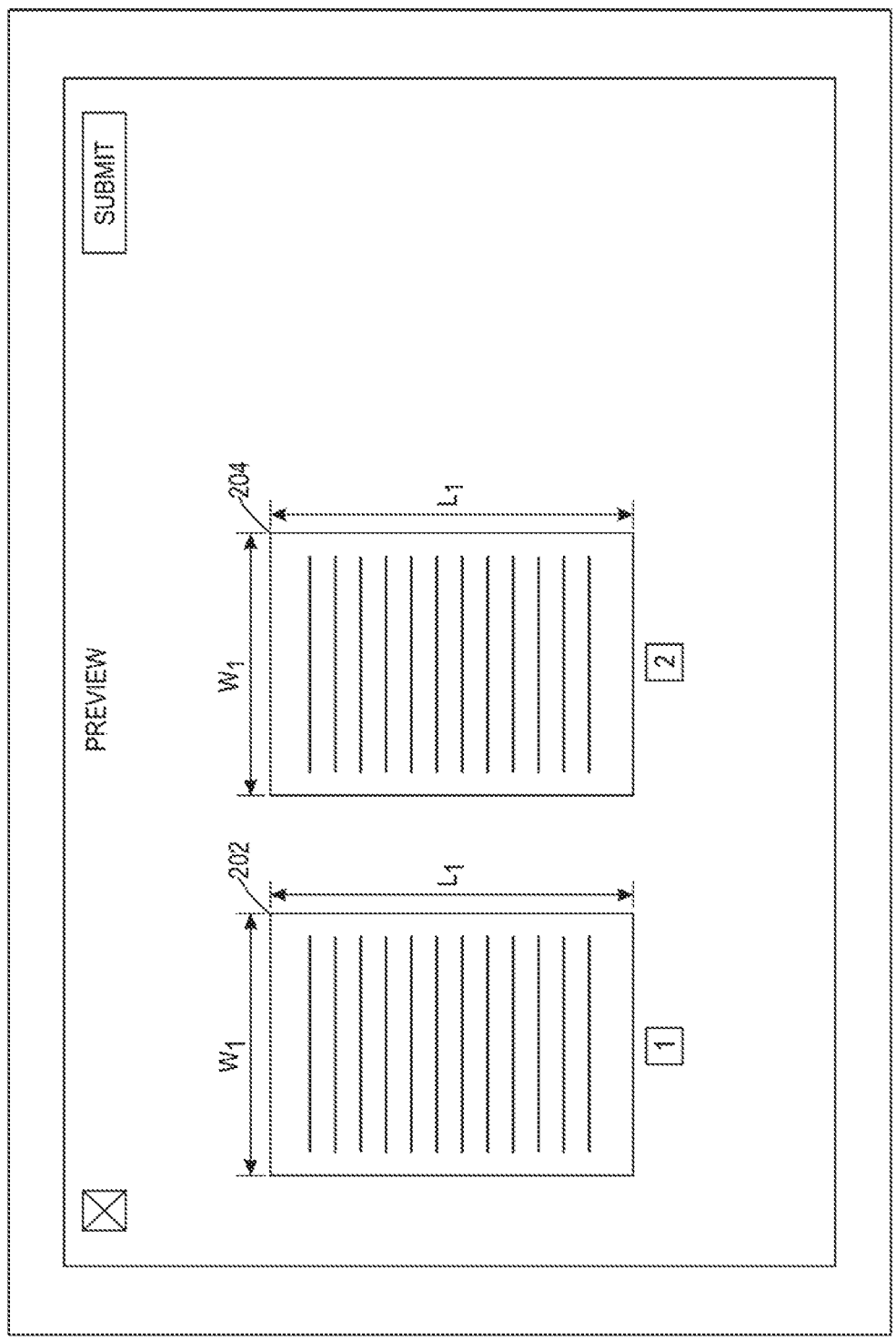
FIG. 2 illustrates an example preview operation of scanned images of the present disclosure.
Figure 3:
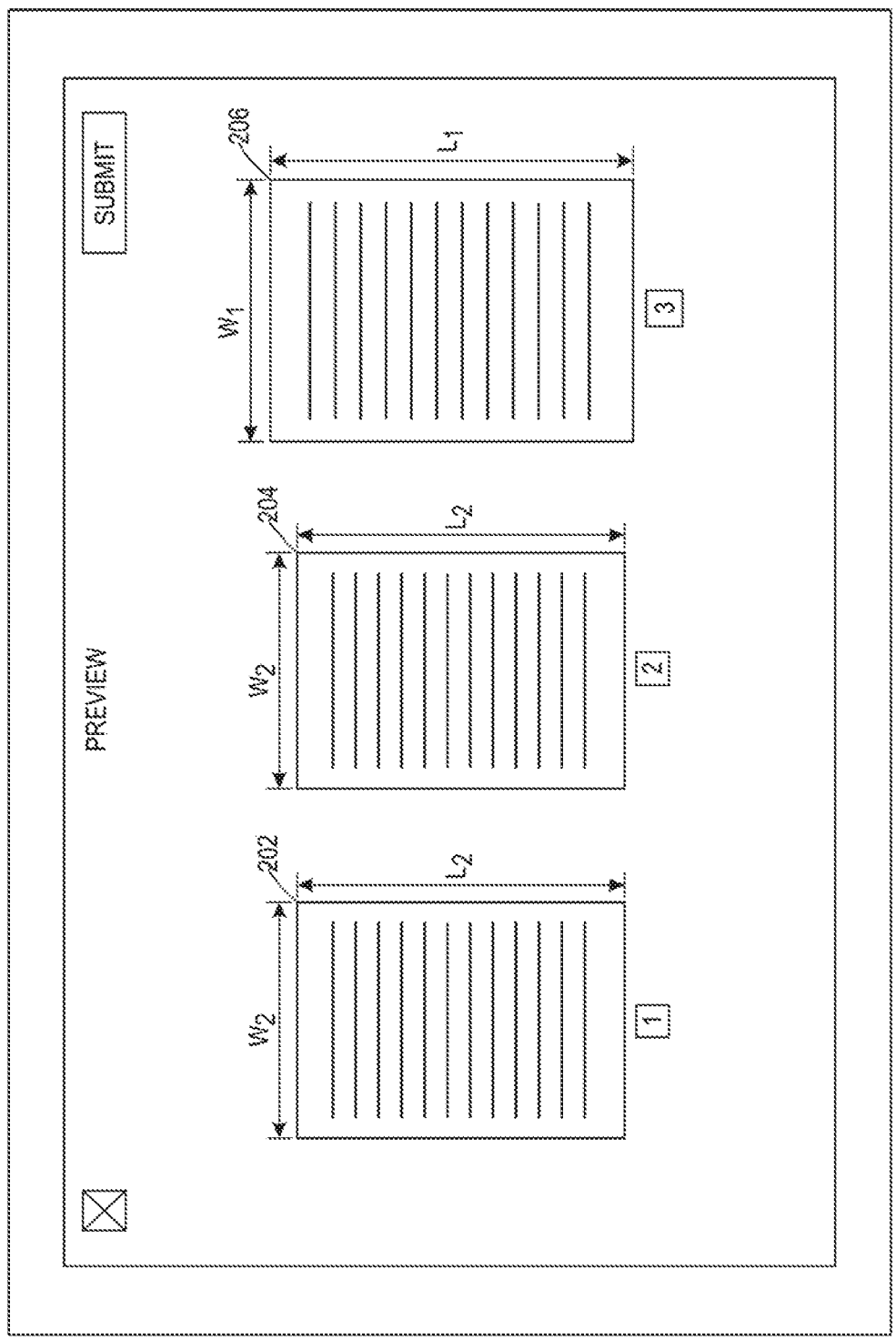
FIG. 3 illustrates an example preview operation of scanned images that have been dynamically scaled of the present disclosure.

FIGS. 2 and 3 illustrate an example of how the size of the previously scanned images can be adjusted when a currently scanned image is larger than a previously scanned image. FIG. 2 illustrates an example of a preview operation that can be shown on the display 104. Scanned images 202 and 204 may be generated based on respective pages of the physical documents 116. For example, the scanned image 202 may be page 1 of the physical documents 116 and the scanned document 204 may be page 2 of the physical documents 116.

In one embodiment, the scanned images 202 and 204 may be shown in a horizontal fashion. The pages may be added in a line horizontally, and as additional scanned images are added a user may scroll through the pages left and right (or horizontally) to preview each page of the physical documents 116 that are scanned. The preview operation may also allow a user to select a scanned image 202 or 204 to zoom into the document to see smaller details, text, images, and the like.

In one embodiment, page 1 and page 2 of the physical documents 116 may be the same size. For example, page 1 and page 2 of the physical documents 116 may each be 8.5 inches×11 inches. Thus, when page 1 and page 2 are scanned to generate the scanned images 202 and 204, the scanned images 202 and 204 may be shown to be the same size. For example, the scanned images 202 and 204 may be shown to have a same width ($w_1$) and a same length ($l_1$).

In one embodiment, the scanned images 202 and 204 may be shown in a largest size associated with the preview operation 112. For example, the preview operation may have a largest image preview size of x by y pixels (e.g., 400×600 pixels, 377×480 pixels, and the like). The largest size may be a function of a size of the display 104, the resolution of the display 104, and the like, and may vary for different displays 104.

FIG. 3 illustrates an example preview operation when sizes of the previously scanned images 202 and 204 are dynamically adjusted. For example, at a later time, page 3 of the physical documents 116 may be scanned by the scanner 106 of the MFD 102. Page 3 may be 8.5 inches×14 inches. In one embodiment, after page 3 is scanned, the processor 108 may receive an image of page 3 and generate a scanned image 206. The processor 108 may compare the size of the scanned image 206 to the previously scanned images 202 and 204. If the size of the scanned image 206 is the same as the size of the previously scanned images 202 and 204, then the scanned image 206 may be shown as the same size as the previously scanned images 202 and 204.

However, if the scanned image 206 is larger than the previously scanned images 202 and 204, then the processor 108 may executed the scanned image adjustment 114 to dynamically change the size of the previously scanned images 202 and 204. For example, the processor 108 may adjust the size of the previously scanned images 202 and 204 to maintain an aspect ratio or relative size to the scanned image 206. In other words, if pages 1 and 2 of the physical documents 116 are 20% smaller than page 3 of the physical documents 116, then the size of the previously scanned images 202 and 204 may be reduced by 20% relative to the size of the scanned image 206.

The processor 108 may generate adjusted previously scanned images of the scanned images 202 and 204 that are smaller than the size shown in the preview operation 112. The scanned image 206 may be shown in the largest image preview size of the preview operation 112.

As shown in FIG. 3, when the processor 108 updates the scanned images 202, 204, and 206 shown in the preview operation 112 of the display 104, the scanned image 206 may be shown to be larger than the previously scanned images 202 and 204. For example, the scanned image 206 may have a width ($w_1$) and length ($l_1$) that were previously associated with the previously scanned images 202 and 204 shown in FIG. 2. The adjusted previously scanned images 202 and 204 may now have a width ($w_2$) and length ($l_2$), where $w_2$ is less than $w_1$ and $l_2$ is less than $l_1$.

Moreover, the difference in $w_2$ and $w_1$ and $l_2$ and $l_1$ may be a function of a ratio of the size difference of pages 1, 2, and 3 of the physical documents 116. As a result, a user may quickly see the relative sizes of each page of the physical documents 116 from the scanned images 202, 204, and 206. This may help the user to more quickly and efficiently review the scanned images of the physical document 116 before submitting the scanned images 202, 204, and 206 for further processing (e.g., emailing the document, printing the document, and the like). For example, the size difference may allow a user to more easily identify if a page is improperly ordered or misplaced in the physical documents 116.

In one embodiment, the preview operation 112 may also maintain or preserve an orientation of the pages of the physical documents 116 that are scanned. For example, page 3 could have been in a landscape orientation. As a result, the scanned image 206 may be shown in the display 104 in a landscape orientation. The orientation may be kept in addition to performing the scanned image adjustment 114. As a result, the user may also be able to quickly see in the preview operation 112 whether a page of the physical documents 116 is improperly orientated quickly before submitting the scanned images 202, 204, and 206 for further processing.

In one embodiment, as additional pages of the physical document 116 are scanned, the processor 108 may repeat the processes described above. For example, the size of each subsequently scanned image may be compared to the previously scanned images. If a subsequently scanned image is the larger than the scanned images 202, 204, and 206, the sizes of the previously scanned images 202, 204, and 206 may be dynamically adjusted to maintain an aspect ratio or relative size, as discussed above. For example, the sizes of the previously scanned images 202 and 204 may be adjusted to be even smaller, the size of the previously scanned image 206 may be reduced, and the subsequently scanned image may be shown in a largest image preview size associated with the preview operation 112.

Figure 4:
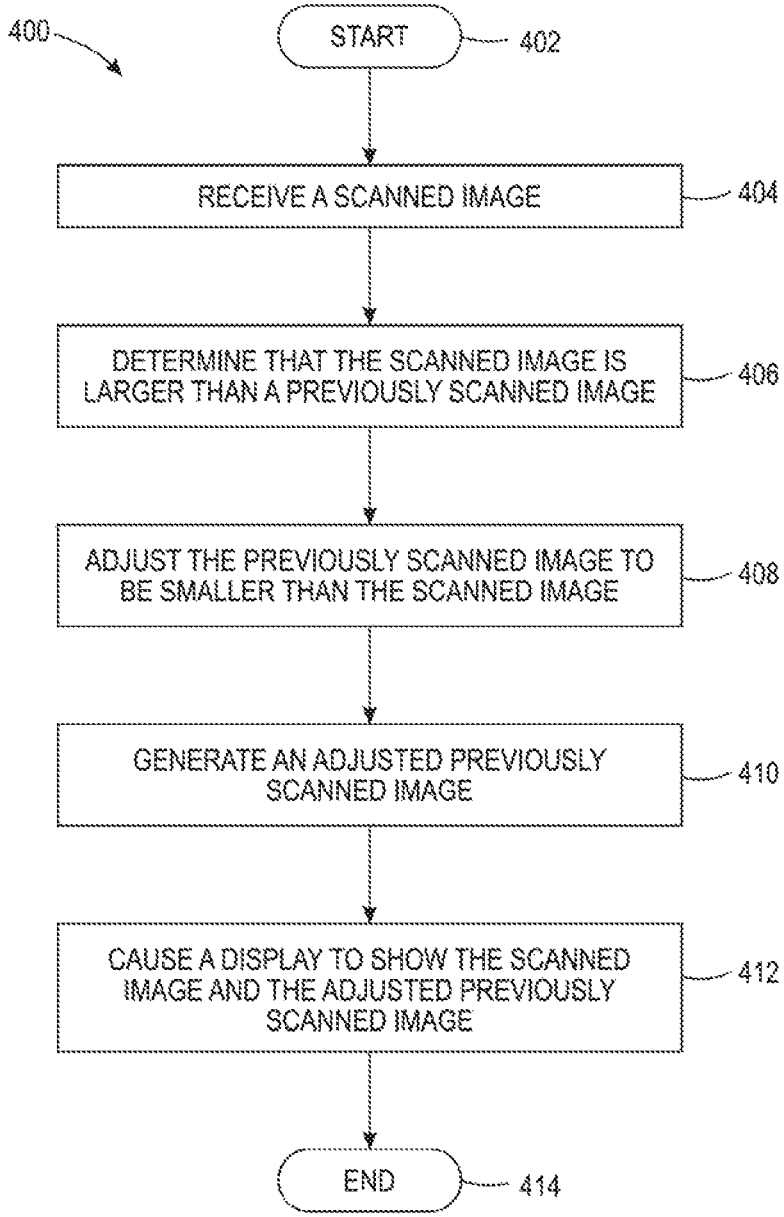
FIG. 4 illustrates a flowchart of an example method for dynamically scaling scanned images of the present disclosure.
Figure 5:
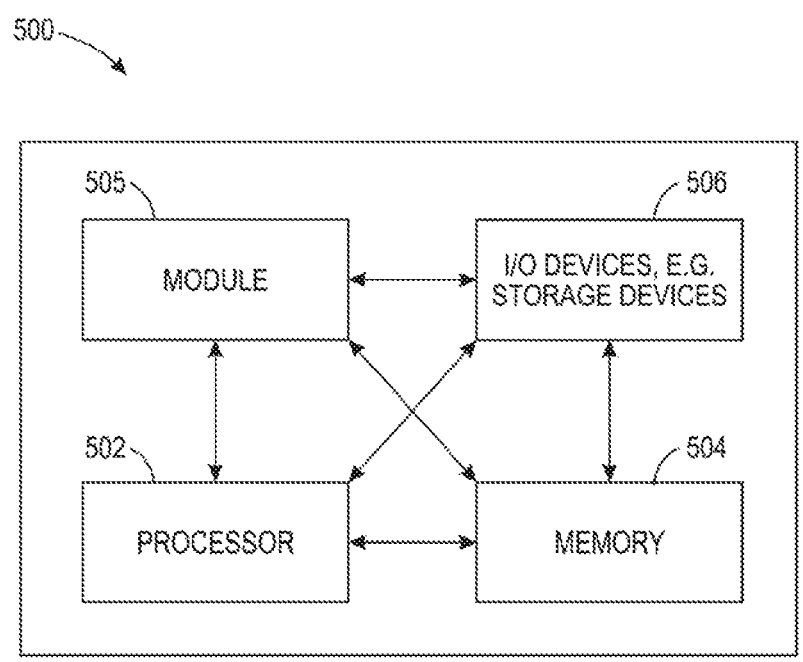
FIG. 5 illustrates a high-level block diagram of an example computer suitable for use in performing the functions described herein.

FIG. 4 illustrates a flowchart of an example method 400 for dynamically scaling scanned images of the present disclosure. In one embodiment, one or more blocks of the method 400 may be performed by the MFD 102, or a computer/processor that controls operation of an MFD as illustrated in FIG. 5 and discussed below.

At block 402, the method 400 begins. At block 404, the method 400 receives a scanned image. For example, the MFD may scan pages of a physical document using a scanner in the MFD. A scanned image of the page that is scanned may be generated and received for processing. In one embodiment, the size of the page that is scanned may be determined based on the image of the page that is scanned by the scanner.

At block 406, the method 400 determines that the scanned image is larger than a previously scanned image. For example, the size of the page associated with the scanned image may be compared to the size of the page or pages associated with previously scanned images. If the size of the page associated with the scanned image is the same size as pages associated with the previously scanned images, then no adjustment may be applied, and the scanned image may be displayed. If the size of the page associated with the scanned image is smaller than the size of the pages associated with the previously scanned images, then the scanned image may be sized smaller in the preview operation. No adjustments to the size of the previously scanned documents may be made. However, in some instances the size of the page associated with the scanned image may be larger than the size of each page of the previously scanned images.

At block 408, the method 400 adjusts the previously scanned image to be smaller than the scanned image. For example, the display size of the previously scanned images can be adjusted to maintain the proper aspect ratio or scale of the scanned images to be similar to the aspect ratio or scale of the size of each page in the physical document. In other words, the amount of adjustment may be based on a ratio of the size of the pages associated with the previously scanned images to the size of the page associated with the currently scanned image.

To illustrate, the size of the pages associated with the previously scanned images may be a first size. The size of the page associated with the currently scanned image may be a second size that is 20 percent larger than the first size. As a result, the size of scanned images that are shown in a preview operation may be reduced by 20 percent relative to the size of the currently scanned image that is shown in the preview operation.

In another example, the size of the pages associated with the previously scanned images may be 8.5 inches×11 inches. The size of the page associated with the currently scanned image may be 8.5 inches×14 inches. Thus, the size of the previously scanned images may be adjusted based on the aspect ratio of 8.5 inches×11 inches to 8.5 inches×14 inches. As a result, the differences in sizes between the previously scanned images and the currently scanned image may be seen in the preview operation.

At block 410, the method 400 generates an adjusted previously scanned image. For example, the scanned image that is to be displayed in the preview operation may be changed to create the adjusted previously scanned image. The adjusted previously scanned image may be the same as the previously scanned images, but shown in a smaller size.

At block 412, the method 400 causes a display to show the scanned image and the adjusted previously scanned image. For example, the scanned image and the adjusted previously scanned image that are generated may be provided to the display to be shown in the preview operation. The scanned image and the adjusted previously scanned image may be shown in a scrollable horizontal row. The scanned image and the previously scanned image may be selected and zoomed in to see closer details of a particular page.

In one embodiment, the method 400 may be repeated for subsequently scanned images. For example, the size of the subsequently scanned images can be compared to the previously scanned images. If the subsequently scanned images have a larger size, then the sizes of the previously scanned images can be adjusted. Adjusted previously scanned images can be generated to be shown in the preview operation on the display. At block 410, the method 400 ends.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for dynamically scaling scanned images, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for dynamically scaling scanned images (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for dynamically scaling scanned images (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for dynamically scaling scanned images, comprising:
   receiving, by a processor, a scanned image;
   determining, by the processor, that the scanned image is larger than a previously scanned image;
   adjusting, by the processor, the previously scanned image to be smaller than the scanned image;
   generating, by the processor, an adjusted previously scanned image; and
   causing, by the processor, a display to show the scanned image and the adjusted previously scanned image.

2. The method of claim 1, wherein the processor is a processor of a multi-function device (MFD) that scans a physical document to generate the scanned image and the previously scanned image.

3. The method of claim 1, wherein orientations of the scanned image and the adjusted previously scanned image are preserved when shown on the display.

4. The method of claim 1, wherein the adjusting comprises:
   adjusting, by the processor, the previously scanned image on a relative scale compared to a size of a physical document associated with the previously scanned image and a physical document associated with the scanned image.

5. The method of claim 1, wherein the scanned image is shown at a largest size at which scanned images are shown on the display.

6. The method of claim 1, wherein the scanned image and the adjusted previously scanned image are shown in a preview operation for scanned images.

7. The method of claim 6, wherein the preview operation shows the scanned image and the adjusted previously scanned image in a scrollable horizontal row.

8. The method of claim 1, further comprising:
   receiving, by the processor, a subsequently scanned image;
   comparing, by the processor, a size of the subsequently scanned image to the scanned image and the adjusted previously scanned image; and
   causing, by the processor, the display to show the subsequently scanned image at a size that matches a size of the scanned image or the adjusted previously scanned image based on the comparing.

9. The method of claim 8, further comprising:
   adjusting, by the processor, the subsequently scanned image to a display size that maintains an aspect ratio of the subsequently scanned image to the scanned image and the previously scanned image when the size of the subsequently scanned image fails to match the size of the scanned image and the previously scanned image.

10. A non-transitory computer-readable medium storing a plurality of instructions, which when executed by a processor, cause the processor to perform operations for dynamically scaling scanned images, the operations comprising:
    receiving a scanned image;
    determining that the scanned image is larger than a previously scanned image;
    adjusting the previously scanned image to be smaller than the scanned image;
    generating an adjusted previously scanned image; and
    causing a display to show the scanned image and the adjusted previously scanned image.

11. The non-transitory computer-readable medium of claim 10, wherein the processor is a processor of a multi-function device (MFD) that scans a physical document to generate the scanned image and the previously scanned image.

12. The non-transitory computer-readable medium of claim 10, wherein orientations of the scanned image and the adjusted previously scanned image are preserved when shown on the display.

13. The non-transitory computer-readable medium of claim 10, wherein the adjusting comprises:
    adjusting, by the processor, the previously scanned image on a relative scale compared to a size of a physical document associated with the previously scanned image and a physical document associated with the scanned image.

14. The non-transitory computer-readable medium of claim 10, wherein the scanned image is shown at a largest size at which scanned images are shown on the display.

15. The non-transitory computer-readable medium of claim 10, wherein the scanned image and the adjusted previously scanned image are shown in a preview operation for scanned images.

16. The non-transitory computer-readable medium of claim 15, wherein the preview operation shows the scanned image and the adjusted previously scanned image in a scrollable horizontal row.

17. The non-transitory computer-readable medium of claim 10, further comprising:

receiving a subsequently scanned image;

comparing a size of the subsequently scanned image to the scanned image and the adjusted previously scanned image; and causing the display to show the subsequently scanned image at a size that matches a size of the scanned image or the adjusted previously scanned image based on the comparing.

18. The non-transitory computer-readable medium of claim 17, further comprising:

adjusting the subsequently scanned image to a display size that maintains an aspect ratio of the subsequently scanned image to the scanned image and the previously scanned image when the size of the subsequently scanned image fails to match the size of the scanned image and the previously scanned image.

19. A method for dynamically scaling scanned images shown in a preview operation on a display of a multi-function device (MFD), comprising:

scanning, by a processor, a physical document of a page to generate a scanned image;

determining, by the processor, a size of the scanned image;

comparing, by the processor, the size of the scanned image to a size of a previously scanned image;

determining, by the processor, that the size of the scanned image is larger than the size of a previously scanned image;

adjusting, by the processor, the size of the previously scanned image to be smaller than the size of the scanned image based on an aspect ratio of the size of the scanned image to the size of the previously scanned image;

generating, by the processor, an adjusted previously scanned image; and causing, by the processor, the display of the MFD to show the scanned image and the adjusted previously scanned image in the preview operation.

20. The method of claim 19, further comprising:

receiving, by the processor, a subsequently scanned image;

comparing, by the processor, a size of the subsequently scanned image to the size of the scanned image and the size of the adjusted previously scanned image; and causing, by the processor, the display to show the subsequently scanned image at the size of the scanned image or the size of the adjusted previously scanned image based on the comparing.

* * * * *